US007478367B2

(12) United States Patent
Morgan et al.

(10) Patent No.: US 7,478,367 B2
(45) Date of Patent: Jan. 13, 2009

(54) DYNAMIC SOURCE CODE ANALYZER

(75) Inventors: Fabian F. Morgan, Austin, TX (US); Brent Russel Phillips, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 909 days.

(21) Appl. No.: 11/032,849

(22) Filed: Jan. 11, 2005

(65) Prior Publication Data
US 2006/0156286 A1  Jul. 13, 2006

(51) Int. Cl.
G06F 9/45 (2006.01)
(52) U.S. Cl. .................................................. 717/124
(58) Field of Classification Search .................. 717/124
See application file for complete search history.

(56) References Cited

U.S. PATENT DOCUMENTS

| | | | | |
|---|---|---|---|---|
| 5,127,103 | A | 6/1992 | Hill et al. ..................... | 395/575 |
| 5,297,150 | A * | 3/1994 | Clark .......................... | 714/26 |
| 5,355,469 | A | 10/1994 | Sparks et al. ............... | 395/575 |
| 5,450,575 | A | 9/1995 | Sites .......................... | 395/700 |
| 5,860,011 | A * | 1/1999 | Kolawa et al. .............. | 717/142 |
| 5,901,315 | A | 5/1999 | Edwards et al. ............. | 395/704 |
| 6,061,518 | A | 5/2000 | Hoffman ..................... | 395/704 |
| 6,202,199 | B1 * | 3/2001 | Wygodny et al. ........... | 717/125 |
| 6,473,896 | B1 * | 10/2002 | Hicken et al. ............... | 717/132 |
| 6,513,154 | B1 | 1/2003 | Porterfield .................. | 717/101 |
| 6,668,369 | B1 * | 12/2003 | Krebs et al. ................. | 717/125 |
| 6,704,923 | B1 | 3/2004 | Gosling ........................ | 717/4 |
| 7,340,726 | B1 * | 3/2008 | Chelf et al. .................. | 717/126 |
| 2002/0093856 | A1 | 7/2002 | Baentsch et al. ............ | 365/200 |

(Continued)

FOREIGN PATENT DOCUMENTS

EP  0 718 742  12/1995

OTHER PUBLICATIONS

Kolawa, Adam, "The Evolution of Software Debugging" Parasoft at http://www.parasoft.com/jsp/products/articles.jsp?articleId=490 (last visited Nov. 4, 2004), printed copy submitted w/IDS.

(Continued)

*Primary Examiner*—John Chavis
(74) *Attorney, Agent, or Firm*—Duke W. Yee; David A. Mims, Jr.; Rudolf O. Siegesmund

(57) ABSTRACT

The invention is an improved integrated development environment (IDE). In particular, the improved IDE comprises a text editor, a source code analyzer, a rule database, and a solution database. The rule database stores source code patterns that represent classes of bugs, while the solution database stores source code patterns that represent corresponding alternative source code that corrects the bugs. The source code analyzer dynamically evaluates source code as a programmer develops the source code in the text editor, periodically comparing source code with the patterns in the rule database. If the source code analyzer matches a pattern with any source code, the source code analyzer displays the corresponding source code pattern from the solution database. The source code analyzer further gives the programmer the option to select the source code pattern from the solution database, at which time the editor changes the source code to conform to the appropriate pattern.

1 Claim, 4 Drawing Sheets

U.S. PATENT DOCUMENTS

2003/0212924 A1* 11/2003 Avvari et al. .................. 714/38
2005/0166193 A1* 7/2005 Smith et al. .................. 717/143
2006/0064677 A1* 3/2006 Bickson et al. ............. 717/124
2006/0150160 A1* 7/2006 Taft et al. .................... 717/126

OTHER PUBLICATIONS

Hailpern & Santhanam, "Software Debugging, Testing, and Verification," IBM Systems Journal, 2002, vol. 41, No. 1, pp. 4-12.

* cited by examiner

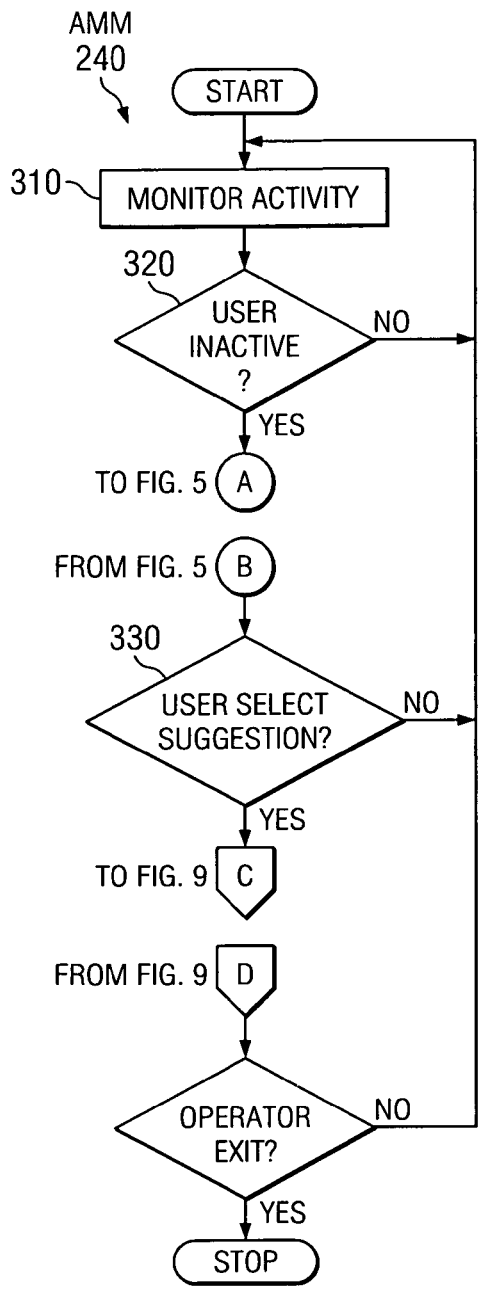
FIG. 3
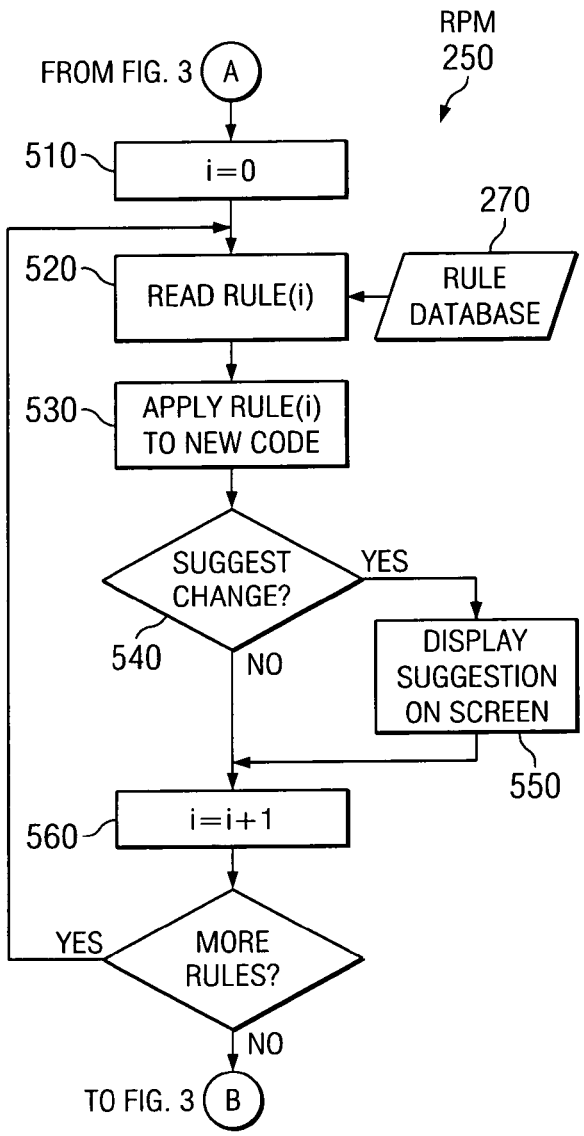
FIG. 5
```
1:  public String test (String value) {
2:      if (value.equals ("start") {
3:          doSomething ( ) ;
4:      }
4:      return "done" ;
5:  }
```
400
FIG. 4

FIG. 6

```
1:   <rule id="12">
2:       <description>NullPointer prevention on "equals" check</description>
3:       <example>
4:           <code id="bad">if (xyz.equals("foo"))</code>
5:           <code id="good">if ("foo".equals (xyz))</code>
6:       </example>
7:       <references>
8:           <reference>
9:               <book>Java Programming Tips pg. 91 (fictitious)</book>
10:          </reference>
11:          <reference>
12:              <certification>Sun Certified Java Programmer Section 2.4.2 (fictitious)</certification>
13:          </reference>
14:      </references>
15:      <patternSearch>
16:          <pattern>[operator].*(.*[stringVar].equals(".*").*)</pattern>
17:      </patternSearch>
18:  </rule>
```

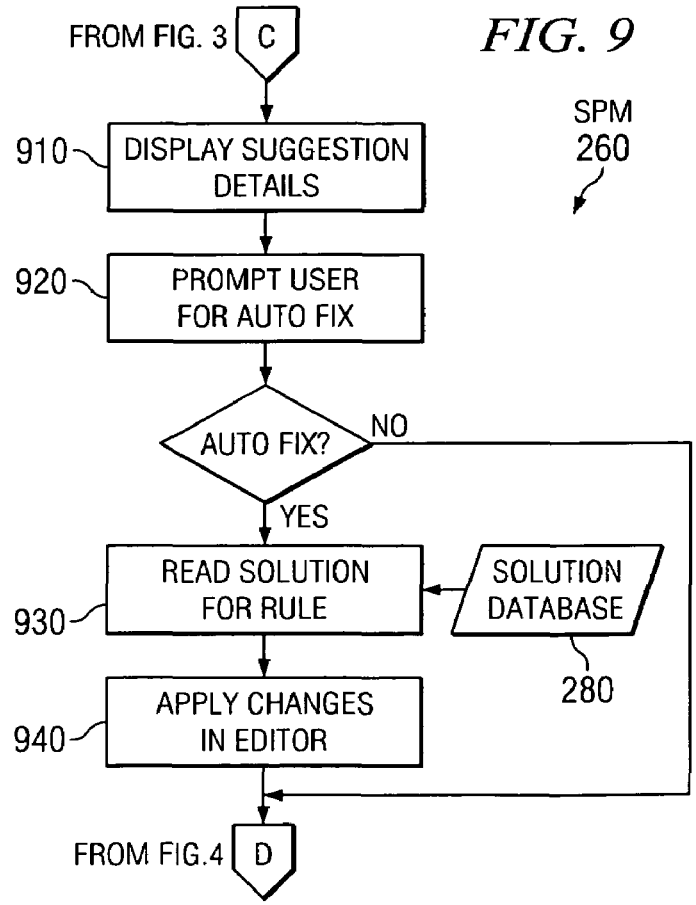

FIG. 9

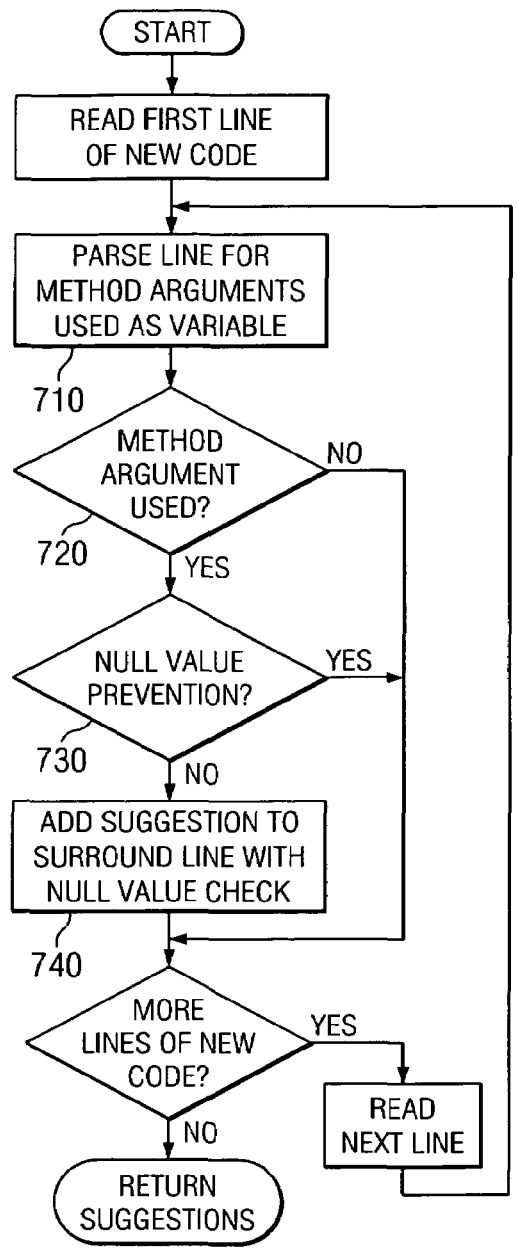
FIG. 7
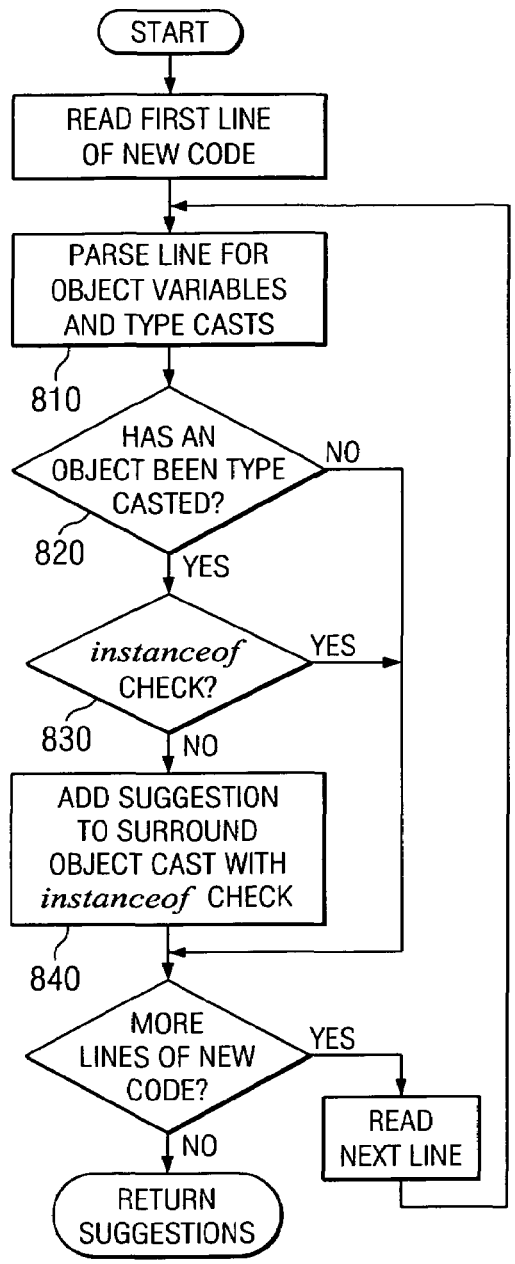
FIG. 8
```
1:   <solution id="12">
2:      <solutionReplacement>
3:         <pattern>[operator].*(.*".*".equals( [stringVar] ) )</pattern>
4:      </solutionReplacement>
5:   </solution>
```
FIG. 10

DYNAMIC SOURCE CODE ANALYZER

FIELD OF THE INVENTION

The present invention is related to software program development tools and techniques, and in particular, to tools for testing program code during development, for the purpose of evaluating the code's correctness and performance.

BACKGROUND OF THE INVENTION

Complex software, particularly software with graphical features, often comprises millions of lines of instructions, or "code." Today, a computer programmer typically uses several types of existing software to build new software. Central to most software engineering projects is a text editor. A "text editor," or "editor" for short, is the computerized equivalent of a typewriter. A programmer uses a keyboard to type instructions, and the editor displays the instructions as text on the computer screen. Each line of text usually represents a single instruction. These textual instructions are referred to generally as "source code." Computer processors, though, are incapable of understanding source code directly. Thus, after entering all of the source code in an editor, a programmer uses a "compiler" to translate the source code into instructions that a computer processor can understand and execute.

As the number of instructions increase, though, so does the probability of errors occurring in the program. Programs may contain many kinds of errors, including syntax errors and logic errors. Such errors have come to be known in the art as "bugs," and hence, the process of locating and correcting such errors is commonly referred to as "debugging."

A syntax error in a program is analogous to a misspelled word or a grammatical mistake in a book. But unlike a person, a computer cannot guess what word the programmer intended to use. For this reason syntax errors usually, but not always, must be found and corrected, using an editor, before a program can be compiled and executed. Logical errors, on the other hand, are latent design defects that cause a computer to execute instructions in an unexpected way, or to produce unexpected results.

Logical errors usually are uncovered only through extensive testing and use of a program. Functional, or "black box," testing remains a common technique for detecting logical errors. In this context, a black box test is a generic procedure to check that a program produces expected output when given certain input. In effect, the actual results of program execution are compared to hypothetical results. A discrepancy between the actual results and the hypothetical results generally indicates the existence of a logic error somewhere in the code.

While a black box test can detect the existence of an error, such a test cannot identify the location of the error. And as most software engineers are painfully aware, most of the time and effort of debugging goes into locating errors, not detecting or fixing them. B. Hailpern & P. Santhanam, *Software debugging, testing, and verification*, 41 IBM Sys. J. 4, 8 (2002) (incorporated herein by reference). Some errors are so elusive that it may take a programmer many months, if not years, to find them. Adam Kolawa, The Evolution of Software Debugging, at http://www.parasoft.com/jsp/products/article.jsp?articleId=490 (last visited Nov. 4, 2004) (incorporated herein by reference).

A debugging technique that programmers developed relatively early in the evolution of software engineering is to insert "print statements" into the source code, which cause a program to display the value of key variables at different steps in the program's execution. Since the programmer knows where to find the print statements in the code, the programmer can narrow the location of code that produces unexpected values for these key variables. See, e.g, id.; Hailpern & Santhanam, supra at 8.

Although print statements have proven useful over the years, and continue to be used widely today, the technique is fairly crude and requires considerable time and effort on the part of the programmer. Id. Specialized debugging programs, colloquially referred to as "debuggers," have evolved over the years to aid programmers in this difficult debugging process. Early incarnations of debuggers generally allowed a programmer to execute one instruction at a time and examine the value of any variable in the program—all without extra print statements in the source code. See Kolawa, supra. A debugger that allows a programmer to step through a program in this manner is commonly referred to as a "runtime debugger." As Kolawa notes, "[i]n principle, a runtime debugger is nothing more than an automatic print statement." Id. Today, most (if not all) compilers include such a runtime debugger. Id. Many debuggers also are marketed as part of an integrated development environment (IDE). An IDE typically includes, at minimum, an editor, a compiler, and a runtime debugger. Hailpern & Santhanam, supra at 8. An IDE debugger generally checks for syntax errors as the programmer develops the code in the editor, without any need to compile the program. Id.

Automated source code analysis (also sometimes referred to as "static testing") is another "well-developed" technique for detecting bugs. Id. at 9. A source code analyzer evaluates a program's source code to identify a particular class of bugs, which the analyzer flags so that the programmer can investigate and correct as needed. Id. A programmer can run such an analyzer before attempting to compile the source code. Id. Moreover, some types of bugs, such as memory leaks, are more readily identified through analysis than testing. Id.

But even with today's high-level languages and sophisticated development environments, errors in syntax and logic remain inevitable—and expensive. Tracking down the location of a single bug in millions of lines of code can be a very time consuming process. In fact, the cost of debugging and testing a typical program today continues to run as high as 50% to 75% of the total development cost. Id. See also Kolawa, supra (debugging consumes 60-70% of development time and is responsible for 80% of all budget overruns).

Thus, there remains a need in the art for an improved software development and testing tool that reduces the time and effort of debugging software. The invention described in detail herein addresses this need. In particular it is an object of this invention to provide a debugging tool that combines the benefits of both a runtime debugger and a source code analyzer, and allows a programmer to identify bugs dynamically—as they are created. This and other objects of the invention will be apparent to those skilled in the art from the following detailed description of a preferred embodiment of the invention.

SUMMARY OF THE INVENTION

The invention described below is an improved integrated development environment (IDE). In particular, the improved IDE comprises a text editor, a source code analyzer, a rule database, and a solution database. The rule database stores source code patterns that represent classes of bugs, while the solution database stores source code patterns that represent corresponding alternative source code that corrects the bugs. The source code analyzer dynamically evaluates source code as a programmer develops the source code in the text editor, periodically comparing source code with the patterns in the rule database. If the source code analyzer matches a pattern with any source code, the source code analyzer displays the corresponding source code pattern from the solution database. The source code analyzer further gives the programmer the option to select the source code pattern from the solution database, at which time the editor changes the source code to conform to the appropriate pattern.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

FIG. 3 is a program flowchart of an IDE having the dynamic black box testing of the present invention;

FIG. 4 lists exemplary JAVA source code;

FIG. 5 is a program flowchart of the rule processing module (RPM) of the present invention;

FIG. 6 is an exemplary XML file listing of a rule database;

FIG. 7 is a program flowchart of a rule for checking a pointer for a null value within the improved IDE;

FIG. 8 is a program flowchart of a rule for checking class casting within the improved IDE;

FIG. 9 is a program flowchart of the solution processing module (SPM) of the present invention; and FIG. 10 is an exemplary XML file listing of a solution database.

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "improved integrated development environment (IDE)."

Figure 1:
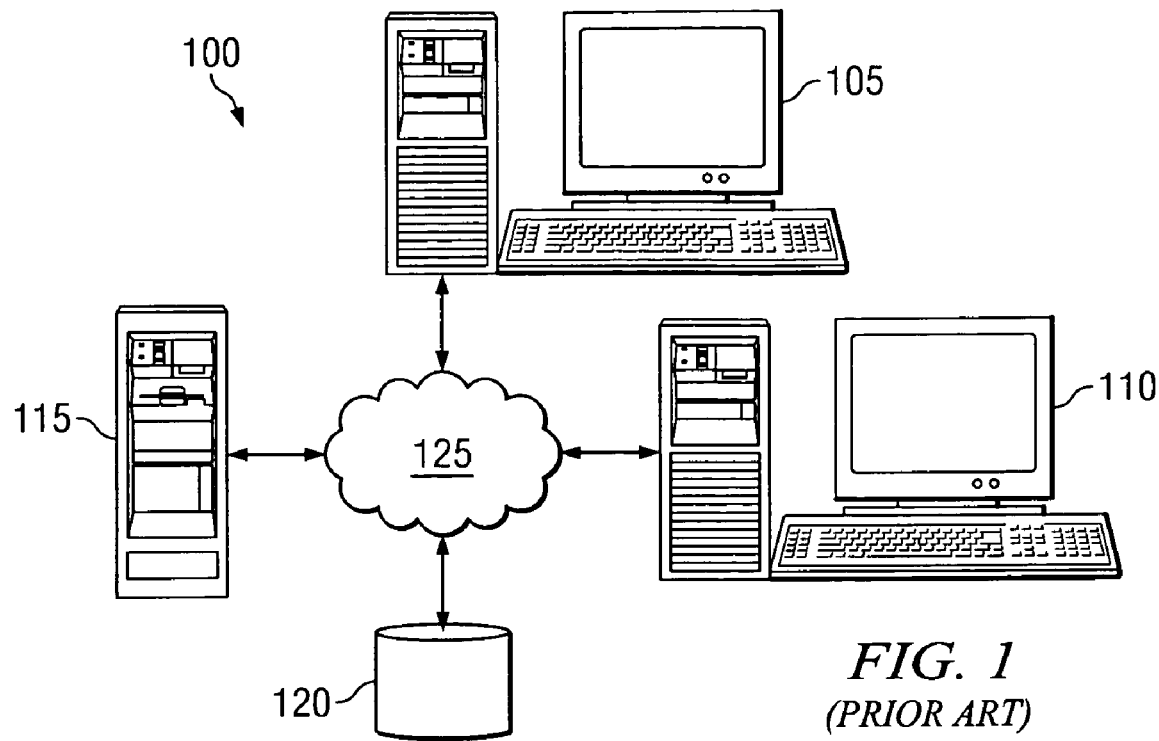
FIG. 1 represents an exemplary prior art network of hardware devices.

Additionally, the improved IDE is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2:
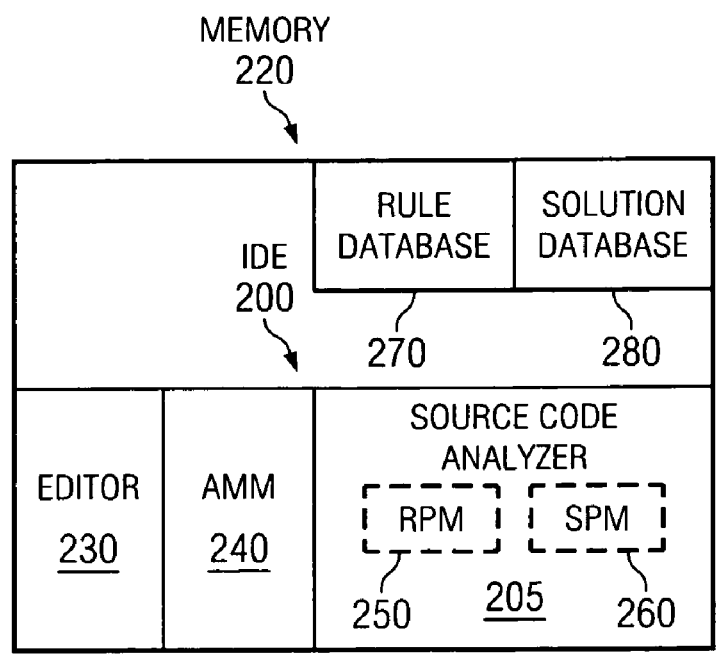
FIG. 2 is a representative schematic of a memory having the components of the present invention.

Improved IDE 200 comprises source code analyzer 205, text editor 230, and activity monitor module (AMM) 240. Source code analyzer 205 comprises rule processing module (RPM) 250 and solution processing module (SPM) 260. Improved IDE 200 and its components typically are stored in a memory, represented schematically as memory 220 in FIG. 2. The term "memory," as used herein, includes without limitation any volatile or persistent medium, such as an electrical circuit, magnetic disk, optical disk, or other storage device in which a computer can store data or software for any duration. A single memory may encompass and be distributed across a plurality of media. Thus, FIG. 2 is included merely as a descriptive expedient and does not necessarily reflect any particular physical embodiment of memory 220. As depicted in FIG. 2, though, memory 220 may include additional data and programs. Of particular import to IDE 200, memory 220 may include rule database 270 and solution database 280, with which IDE 200 and its components interact. As used herein, the term "database" means any collection of data stored together and organized for rapid search and retrieval, including without limitation flat file databases, fielded databases, full-text databases, object-oriented databases, and relational databases.

Referring to FIG. 3 for illustration, an operator, such as a computer programmer, generally starts IDE 200 and, using editor 230, enters source code 400, see FIG. 4, as text in IDE 200. The following discussion employs source code 400 as a simple expedient to illustrate the inventive features of the improved IDE, but a person of ordinary skill in the art should appreciate that such inventive features are applicable to significant variations of this simple example. In particular, such a person should recognize the general applicability of improved IDE 200 to any high-level programming language, such as C or C++, as well as programming projects of all scope and complexity.

In a typical session with a prior art IDE, a programmer enters source code with a keyboard and the IDE's editor displays the source code on the screen. Generally, though, a programmer does not enter the source code for an entire program continuously during any single period of activity. Rather, a programmer typically develops source code in multiple periods of activity of varied duration. In the preferred embodiment of improved IDE 200, AMM 240 monitors the programmer's data entry activity (310) and, upon detecting a period of inactivity (320), transfers program control to RPM 250. In an alternate embodiment, though, AMM 240 transfers program control to RPM 250 each time the programmer completes a line of source code, striking the "Enter" or "Return" key or the like.

In general, RPM 250 compares source code with a set of source code patterns stored in a rules database, and, responsive to detecting source code that matches the pattern, displays a suggested source code change to the programmer. FIG. 5 illustrates one embodiment of this process in more detail. As FIG. 5 illustrates, RPM 250 first sets a counter variable ("i") to 0 (510) and then reads a rule ("rule(i)") (520)

from rule database 270. RPM 250 then applies rule(i) to "new" source code 400 (530). "New" source code refers to any code entered or modified since the last time AMM 240 transferred program control to RPM 250. For purposes of this discussion, it is assumed that all lines (lines 1-5) of source code 400 are new. If rule(i) returns any suggestions (540), see FIGS. 7 and 8 and discussion below, RPM 250 displays the suggestion to the programmer (550) within IDE 200. RPM 250 then increments the counter variable (i=i+1) (560) and repeats this procedure for each rule(i) in rule database 270, returning program control to IDE 200 or AMM 240 after applying all rules.

Rule database 270 may be integrated into IDE 200, but preferably is stored as an external file in Extensible Markup Language (XML), such as the file listed in FIG. 6. FIG. 6 illustrates an XML embodiment of exemplary rule database 270 that defines null pointer rule 620. In the exemplary file that FIG. 6 illustrates, line 1 assigns the value "12" to the "id" attribute of null pointer rule 620. Line 2 provides descriptive text that RPM 250 may display along with the suggestions associated with the rule. Lines 3 through 6 provide the suggestions, comprising exemplary code segments, that RPM 250 displays when source code 400 matches the pattern defined in lines 15 through 17. The optional reference elements in lines 7 through 14 indicate sources where the programmer can find more information on the relevant programming technique or suggestion. RPM 250 also displays these references along with the rule's suggestions.

FIG. 7 illustrates the process of applying null pointer rule 620 to source code 400 (530) (see FIG. 5). In this implementation, the process first reads each line of source code 400 and parses the line (710), using regular expression matching or other common string-parsing routines, to compare the line of source code 400 with the pattern defined in lines 15 through 17 of null pointer rule 620. This comparison determines if the program is attempting to use an argument of the method (or any other type programming unit that accepts arguments) as a variable (720). If the program is attempting to use an argument as a variable, then the process determines if the program has implemented any source code to prevent null values (730). If the program has not implemented any null value prevention, then the process adds the suggestion, as defined in lines 3 through 6 of null pointer rule 620, to an array or list (740), suggesting that the programmer implement similar code. After parsing all lines of source code 400, the process returns the array or list of suggestions to the calling program.

Thus, applying null pointer rule 620 to source code 400 as described above, RPM 250 first would check rules 1 through 11 (not shown). RPM 250 then would read null pointer rule 620 and compare each line of source code 400 with the pattern defined on line 16 of null pointer rule 620. In this example, RPM 250 would find that line 2 of source code 400 matches the pattern and then display the suggestions defined on lines 3 through 6 of null pointer rule 620. Optionally, RPM 250 also displays the descriptive text of line 2 and the references provided in lines 7 through 14 of null pointer rule 620.

FIG. 8 illustrates the details of applying a "casting" rule to source code 400 (530) (see FIG. 5). A "casting rule", as that term is used herein, checks for common errors associated with casting an object variable to another data type, As FIG. 8 illustrates, the process reads each line of source code 400 and parses the line (810), using regular expression matching or other common string-parsing routines, to determine if the operator has cast an object variable to another data type (820). If the operator has cast an object to another data type, then the process determines if the programmer has implemented a corresponding instanceof( ) call (830). If the programmer has not implemented an instanceof( ) call, then the process adds a suggestion (840), in the form of descriptive text provided in rule database 270, to an array, list or other suitable data structure, suggesting that the programmer implement such a call. After parsing all lines of source code 400, the process returns the array or list of suggestions to the calling program.

Returning again to FIG. 3 for illustration, if the programmer selects a suggestion (330) that RPM 250 displays, then IDE 200 transfers control to SPM 260. FIG. 9 illustrates one implementation of SPM 260. In general, SPM 260 allows the programmer to modify source code 400 according to a solution associated with the selected suggestion. More particularly, as FIG. 9 illustrates, SPM 260 first displays any additional suggestion details (910) and then asks the programmer for permission to automatically implement the solution (920). If the programmer grants permission to implement the solution, SPM 260 then reads the solution (930) from solution database 280. SPM 260 then applies the solution, causing editor 230 to display the accompanying changes to source code 400 (940).

FIG. 10 illustrates an XML embodiment of a portion of solution database 280. In particular, FIG. 10 illustrates the solution to null pointer rule 620. As FIG. 10 illustrates on line 1, each solution has an "id" attribute, just as each rule in rule database 270 has an "id" attribute. Using these "id" attributes, SPM 260 maps each rule to a corresponding solution. Thus, if the programmer grants permission to implement the solution for null pointer rule 620, as applied to source code 400, SPM 260 locates the corresponding solution (id=12) in solution database 280 and causes editor 230 to apply the pattern identified on lines 2 through 4 to the appropriate portion of source code 400.

SPM 260 then transfers control back to IDE 200, where AMM 240 continues to monitor the programmer's activity until the programmer exits IDE 200.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A computer-implemented process for dynamically identifying bugs as a programmer creates a source code in a text editor, the process comprising:
   storing a first plurality of first patterns in a first database, each first pattern representing a plurality classes of programming errors;
   storing a second plurality of second patterns in a second database, each second pattern representing a code that corrects a corresponding programming error;
   using a source code analyzer connected to the first database and to the second database, dynamically evaluating the source code as the programmer creates the source code in the text editor by periodically comparing the source code with the first plurality of first patterns, and responsive to matching a segment of the source code with a first pattern, displaying a corresponding second pattern;
   prompting the programmer to select the corresponding second pattern; and
   responsive to the programmer selecting the corresponding second pattern, causing the text editor to change the source code to conform to the second pattern;
   wherein a programming error is identified as the programming error is created and dynamically corrected during the creation of the source code.

* * * * *